(12) United States Patent
Study et al.

(10) Patent No.: US 6,756,895 B2
(45) Date of Patent: Jun. 29, 2004

(54) DEVICE LEARNING MODE METHOD

(75) Inventors: Robert Study, Arlington Heights, IL (US); Eric Robb, Carol Stream, IL (US); Robert Rainey, Temecula, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 19 days.

(21) Appl. No.: 10/073,665

(22) Filed: Feb. 11, 2002

(65) Prior Publication Data

US 2003/0151496 A1 Aug. 14, 2003

(51) Int. Cl.[7] .............................................. G08B 29/00
(52) U.S. Cl. ...................... 340/506; 455/418; 455/420; 340/522; 340/825.69
(58) Field of Search ........................... 455/418, 414.1, 455/420, 423, 67.11, 67.7, 66.1; 700/90; 341/173; 340/5.22, 5.23, 5.25, 5.26, 5.7, 5.71, 506, 5.8, 825.69, 825.22, 825.72, 531, 539.1, 5.72, 10.1, 518

(56) References Cited

U.S. PATENT DOCUMENTS

| | | |
|---|---|---|
| RE29,525 E | 1/1978 | Willmott |
| 4,385,296 A | 5/1983 | Tsubaki et al. |
| 4,750,118 A | 6/1988 | Heitschel et al. |
| 4,855,713 A | 8/1989 | Brunius |
| 4,859,990 A | 8/1989 | Isaacman |
| 4,912,463 A * | 3/1990 | Li ........................... 340/825.69 |
| 5,148,159 A * | 9/1992 | Clark et al. ............. 340/825.22 |
| 5,229,763 A * | 7/1993 | Nakamaru ............... 340/825.72 |
| 5,473,318 A | 12/1995 | Martel |
| 5,481,252 A * | 1/1996 | Kwon et al. ............ 340/825.22 |
| RE35,364 E | 10/1996 | Heitschel et al. |
| 5,781,143 A | 7/1998 | Rossin |
| 5,907,279 A * | 5/1999 | Bruins et al. ................ 340/506 |
| 6,025,785 A | 2/2000 | Farris et al. |
| 6,049,289 A * | 4/2000 | Waggamon et al. ........ 340/5.23 |
| RE36,703 E * | 5/2000 | Heitschel et al. .............. 700/90 |
| 6,067,028 A * | 5/2000 | Takamatsu ................... 340/5.8 |
| 6,078,271 A * | 6/2000 | Roddy et al. ........... 340/825.72 |
| 6,166,650 A | 12/2000 | Bruwer |
| 6,191,701 B1 | 2/2001 | Bruwer |
| RE37,986 E | 2/2003 | Heitschel |

OTHER PUBLICATIONS

International Search Report for PCT patent application PCT/US03/03802 completed on Jun. 17, 2003.

* cited by examiner

*Primary Examiner*—Charles Appiah
(74) *Attorney, Agent, or Firm*—Fitch, Even, Tabin & Flannery

(57) ABSTRACT

A learning mode 40 permits a device 11 to register a plurality of transmitters (as part of authorizing such transmitters to act as remote control devices for use with a movable barrier operator 12) without necessitating intervening user tactile inputs (as through a user interface keypad 33) and without unnecessarily creating a security risk with respect to the duration of the learning mode. In one embodiment, duration of the learning mode is extended in response to detecting indicia that the learning mode continues to be used.

23 Claims, 4 Drawing Sheets

DEVICE LEARNING MODE METHOD

TECHNICAL FIELD

This invention relates generally to device learning modes.

BACKGROUND

Many devices, though programmed or designed to effectuate one or more specific tasks, must nevertheless be provided with supplementary information from time to time in order to properly execute such task(s). For example a movable barrier operator (such as, for example, a garage door or gate opener) can be provided by the manufacturer with functionality that permits use of the movable barrier operator with a movable barrier, but this initially provided information will often not be sufficient to ensure complete or compatible usage. As one example, a property may use a movable barrier operator to control access to a certain area. Access may be allowed to only, say, 250 individuals. If each individual is provided with a remote control transmitter to interface with the movable barrier operator, identifying information for such transmitters will ordinarily not be known at the outset to the operator. Consequently, the operator must learn this identifying information in order to operate at desired.

Various ways are known to support such a learning process. Very typically, and still using movable barrier operators as an example, a user will press one or more buttons or keys on the device to initiate the learning mode. Additional entries may be necessary to effectuate different purposes (for example, it may be necessary for the user to enter a specific memory location or alias/identifier for each given transmitter to be registered). The user then activates a transmitter and the signals from the transmitter are received by the device while still in the learn mode. The device will then store the identifying information contained in the transmission and conclude the learn mode. Such an approach works acceptably in some circumstances but is considerably deficient in other settings. For example, if the user must register a large number of transmitters (many such systems will support hundreds of such transmitters or even more), then the above process can be tedious, time consuming, and prone to error.

At least one prior art approach attempts to ameliorate this problem by remaining in a learn mode for a predetermined period of time (such as 30 seconds) and allowing a number (such as 4) of transmitters to be registered during that period of time. While possibly acceptable for a small number of transmitters, again, such an approach presents little improvement for a user looking to program a considerably larger population. On the other hand, extending such the period of time for the learn mode in this approach is typically considered ill-advised, as any compatible transmission as received during this period of time will be accepted into the system. Therefore, extending the period of the learning window in this fashion is viewed as a significant security risk and hence, is eschewed as a viable approach.

BRIEF DESCRIPTION OF THE DRAWINGS

The above needs are at least partially met through provision of the learning mode method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

Generally speaking, pursuant to these various embodiments, a control device detects, through a user interface, tactile user input that initiates a learning mode. In the learning mode, the control device monitors for both supplemental tactile user input and received transmissions. Upon detecting supplemental tactile user input that constitutes a specific memory location, the control device will store later received identifying information for a next transmitting transmitter at that specific memory location. If, however, a transmission is received prior to receiving any such supplemental tactile user input, then the identifying information contained in that transmission is stored at an automatically determined memory location. So configured, the user has an option to program a transmitter with minimized tactile user inputs being absolutely required. In one embodiment, the automatically determined memory location can be presented to the user on a display, thereby providing information to the user that can inform a decision regarding whether to enter a specific memory location for subsequent use to store identifying information from a transmitter.

In one embodiment, upon beginning the learning mode, a learning mode window can be initiated such that multiple transmissions as received during the learning mode window can each be stored at an automatically designated memory location. So configured, a plurality of transmitters can be registered, again without intervening tactile user input if so desired by the user. In yet another embodiment, the learning mode window can be extended each time a specific event occurs (such as receiving a transmission or the user enters a specific memory location). So configured, a large number of transmitters can be processed and registered without requiring intervening tactile user inputs and without requiring a long learning window that presents unacceptable security risk.

Referring now to the figures, additional details regarding these embodiments will be presented.

Figure 1:
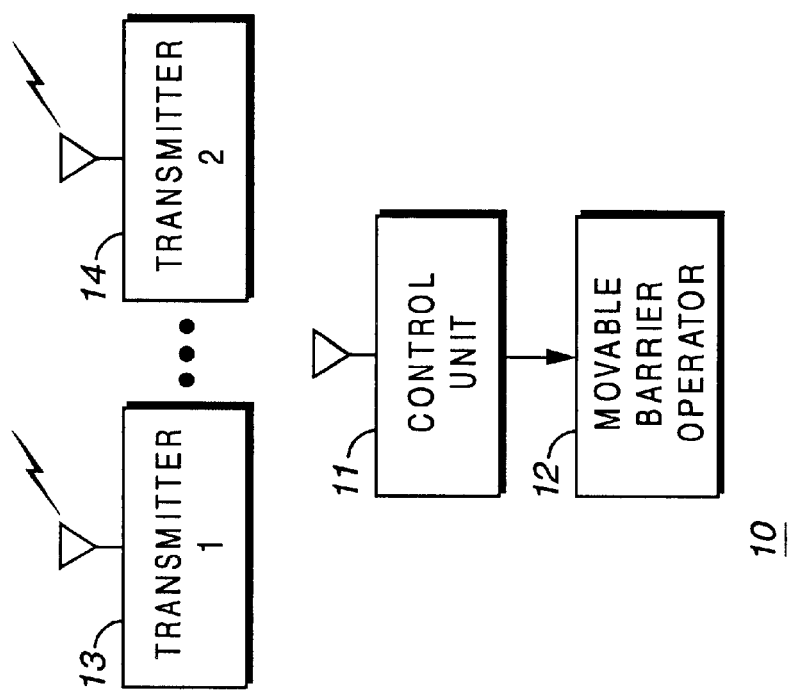
FIG. 1 comprises a block diagram depiction of one embodiment of a system configured in accordance with the invention.

Referring now to FIG. 1, a given system 10, in this embodiment, includes a control device 11 that is coupled to a movable barrier operator 12 such that the control device 11 can provide control signals to the movable barrier operator 12 to thereby control, at least to some extent, a movable barrier as operated by the movable barrier operator 12. The control device 11 provides such control signals in response to receiving appropriate transmissions from any of a plurality of previously registered remote control transmitters (represented here by transmitter 1 and transmitter 2 as denoted by reference numerals 13 and 14). The number of transmitters supported will vary with the application, and will typically number in the hundreds, though 1,000 or more are certainly possible. In this particular embodiment, up to 250 such transmitters are presumed to be supported by the system 10. Pursuant to the embodiments described below, in various ways a learning mode can be used to conveniently allow the control device 11 to learn the identifying information that corresponds to each authorized transmitter. This information, once learned, is then used by the control device 11 to allow the control device 11 to essentially authenticate subsequent transmissions from registered transmitters.

Figure 2:
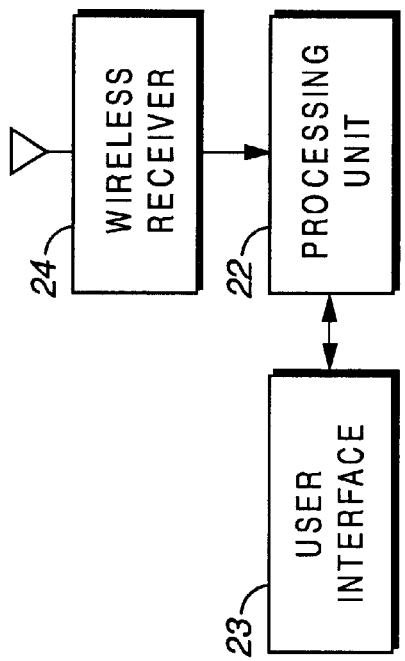
FIG. 2 comprises a block diagram depiction of an embodiment of a control unit 11 as configured in accordance with the invention.

Referring now to FIG. 2, the control device 11 includes a processing unit 22 as provided, for example, through use of a microprocessor with supporting circuitry and outlying components. The processing unit 22 preferably comprises a programmable platform that is programmable to effect the activities described below. The processing unit 22 couples to a user interface 23 which will typically be disposed in a manner that is accessible to a user (more details regarding the user interface 23 are provided below). The user interface 23 allows a user to interact directly with the control device 11 to effect, for example, a learning mode as described below. In this embodiment, the processing unit 22 also couples to a wireless receiver 24 that at least receives transmissions from various transmitters including the remote control transmitters that are authorized through pre-registration with the control device 11.

Figure 3:
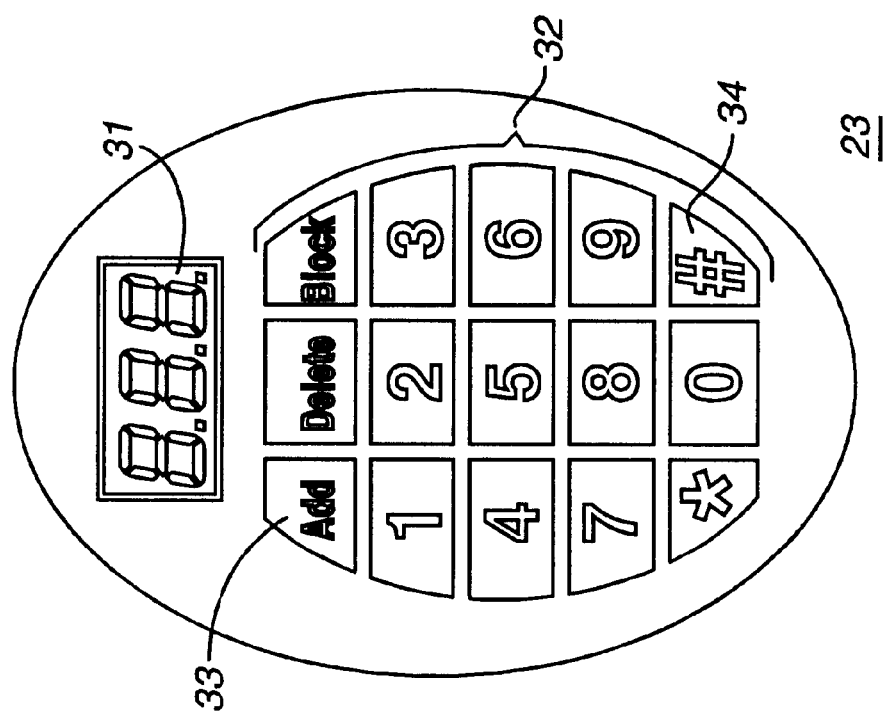
FIG. 3 comprises a view of an embodiment of a user interface for a control unit 11 as configured in accordance with the invention.

Referring now to FIG. 3, the user interface 23 includes a display 31 and a keypad 32. The display 31 allows various information to be presented to the user as appropriate to various supported functionality. The keypad 32 comprises a tactile interface that allows a user to enter information and/or express commands to the control device 11. For example, in this embodiment, to initiate a learning mode the user asserts the "Add" key 33 and to conclude a learning mode the user asserts the pound sign "#" key 34.

Figure 4:
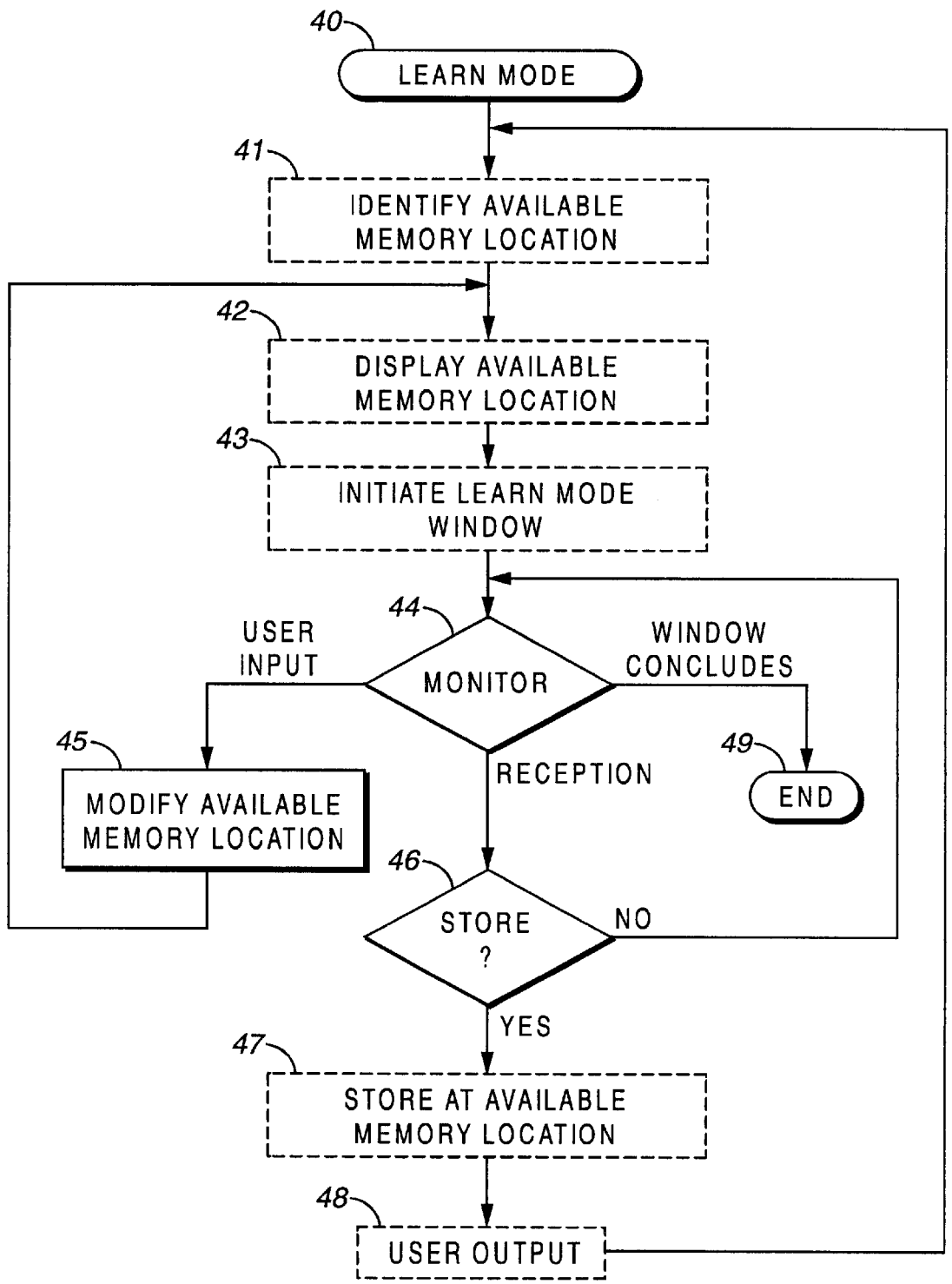
FIG. 4 comprises a flow diagram of various embodiments as configured in accordance with the invention.

Referring now to FIG. 4, the control device 11 is programmed or otherwise configured to support a learning mode that operates as follows. Upon entering 40 a learning mode (for example, as happens in this embodiment when the user asserts the "Add" key 33 described above), the control device 11 can, optionally, automatically identify 41 an available memory location for use when storing identifying information as contained in a next received transmission. The memory location can be identified in a variety of ways. For example, only memory locations that are presently empty may be considered as suitable candidates. Of the empty memory locations, the control device 11 could select the memory location having the highest sequential address. Or the memory location could be chosen at random. Other approaches are of course available. In this embodiment, the control device 11 selects the memory location that is both empty and that has the lowest corresponding address. When such a memory location is identified, the control device 11 can also optionally display 42 that information. For example, the address location (or user-friendly alias for such address location) can be displayed using the user interface display 31 noted above.

Also optionally, a learning mode window can be initiated 43. Such initiation can occur following the optional memory location identification described above (and as depicted in FIG. 4) or can precede the above optional steps as appropriate or desired to suit a given application. This learning window can be for a predetermined and constant period of time (such as, in this embodiment, about 30 seconds) or can be varied in length depending upon the particular needs of a given application. In the alternative, the learning window can be determined by a count or other milestone detection that, while not literally constituting a clock, is regular enough to ensure that the learning window will only be of relatively limited duration. Various durations can be considered, but at least 25 seconds appears appropriate for many operating conditions.

The control device 11 then monitors 44 to detect, in this embodiment, any of supplemental tactile user input (as provided through the user interface keypad 32), reception of a compatible transmission, and conclusion of the learning mode window when that option has been selected. When supplemental tactile user input is received that constitutes information that identifies a specific memory location, the control device 11 modifies 45 (or designates for the first time, as the case may be) the identification of the memory location that is considered available. The process then returns to optionally display the available memory location and, when the learning mode window option has been selected, re-initiates the learning mode. The control device 11 then returns to monitoring 44 status.

So configured, while the learning mode window is only, in this embodiment, about 30 seconds, that window is automatically extended when the user inputs specific memory location information. This holds the control device 11 in extended readiness to receive and register information for additional transmitters without requiring specific intervening actions from the user that are solely required to begin or extend the learning mode.

Figure 5:
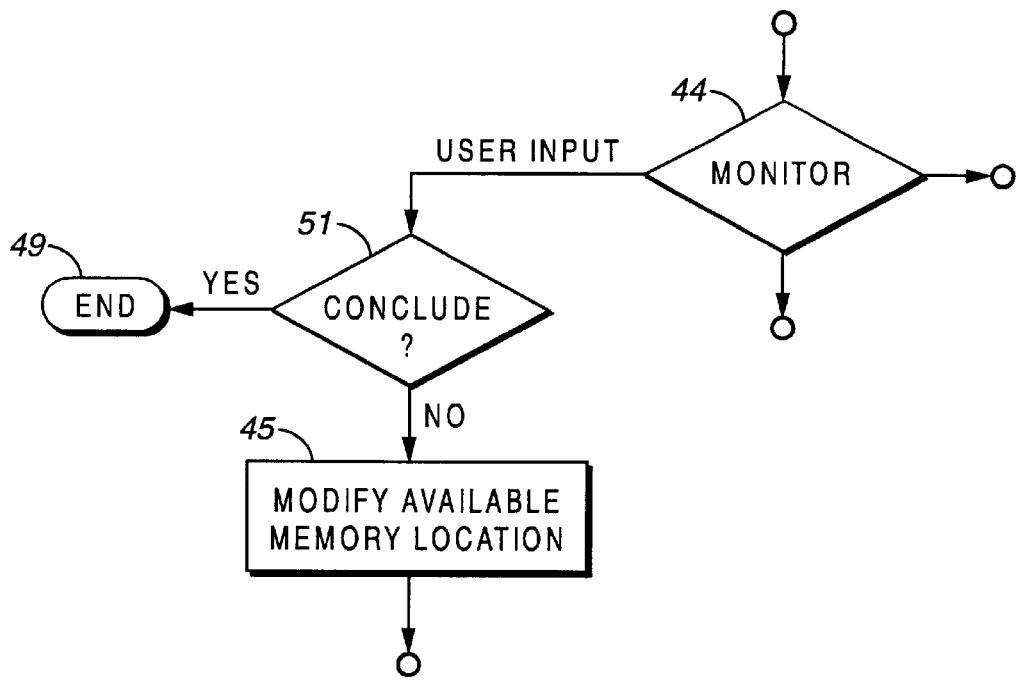
FIG. 5 comprises a detailed flow diagram of an alternative embodiment as configured in accordance with the invention.

With momentary reference to FIG. 5, the tactile user input can optionally be assessed to determine 51 whether the input instead-comprises an instruction to conclude the learning mode (as happens in this embodiment when the user asserts the pound key "#" 34 on the user interface keypad 32 as noted earlier). Upon detecting this instruction, the control device 11 can end 49 the learning mode.

When the control device 11 monitors 44 reception of a transmission, the control device 11 decides whether to store 46 the corresponding identifying information as contained in the transmission. If not, for whatever reason, the control device 11 returns to the monitoring 44 state. If storage is appropriate, then the control device 11 stores 47 the identifying information from that transmission at the available memory location. The control device can then optionally display 48 the address of that memory location on the user interface display 31. The process then returns to allow identification of a next available memory location (when that option has been selected) and in any event, when the learning mode window option is being used, the process returns to re-initiate the learning mode window to again extend the duration of the window as described above.

Figure 6:
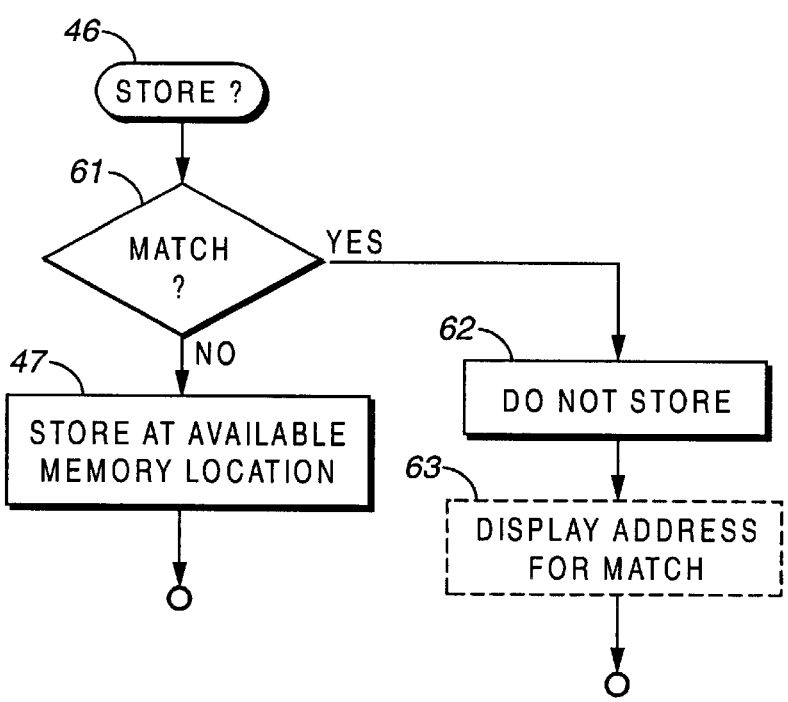
FIG. 6 comprises a detailed flow diagram of yet another alternative embodiment as configured in accordance with the invention.

With momentary reference to FIG. 6, the storing determination 46 can optionally include a determination 61 as to whether the newly presented identifying information matches any already-stored identifying information. If no match occurs, the control device 11 can store 47 the identifying information as described above. When a match does occur, however, the control device will conclude to not store 62 the identifying information (this notion of "not storing" the information, of course, is with reference to a working or permanent memory for the control device 11 and is not meant to refer to buffer memory or the like where the information must of necessity temporarily be stored in order to effectuate the actions described herein). Optionally, the address for the memory location that contains the previously stored information that matches the newly presented information can be displayed on the user interface display 33. The process can then proceed as described above.

Of course, when eventually the learning mode window concludes without either an intervening user input or reception event, the process will conclude 49.

So configured, a user can make a single tactile input (in this embodiment, asserting the "Add" key 33) and thereafter register transmitter after transmitter with being required to make subsequent tactile entries until, ultimately, the available memory becomes filled. When the learning mode window is set appropriately (for example, for many purposes, around 30 seconds works well), sufficient time exists to obtain and manipulate the transmitters to be registered without needing to especially hurry and also without an undue risk of the learning mode extending on without need. By slaving the duration of the learning mode to indicia that the learning mode itself is still properly engaged, the task of registering a large number of transmitters is greatly eased without a concurrent undue risk to security and integrity of the system.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept For example, when a user uses the user interface keypad to enter a specific memory location during the learning mode, the control unit 11 could assess whether that specific memory location was already occupied, and if occupied, could take a predetermined action (such as alerting the user to this circumstances by an audible alert and/or a visual alert). As another example, the control unit 11 can be configured to provide an indication (audible and/or visual) to the user when there are no available memory locations. When the user initiates the learning mode, the control unit 11 could determine that no available memory locations exist and present "FuL" on the display to indicate this condition. In addition, an audible signal, such as a long-sounding tone, could accompany this display.

We claim:

1. A method comprising:
  A) detecting a tactile user input that corresponds to initiation of a learning mode;
  B) monitoring for both additional tactile user input and reception of a wireless transmission;
  D) upon detecting additional tactile user input that comprises identification of an address for a memory location before detecting the received wireless transmission automatically thereafter storing at that memory location identifying information as is contained in a later received compatible wireless transmission;
  C) upon detecting a received wireless transmission that comprises a compatible wireless transmission containing identifying information before detecting additional tactile user input that comprises identification of an address for a memory location, automatically thereafter storing at an automatically determined memory location the identifying information as corresponds to the earlier received wireless transmission.

2. The method of claim 1 and further comprising, subsequent to detecting a tactile user input and prior to monitoring, displaying the automatically determined memory location.

3. The method of claim 2 and further comprising, prior to displaying the automatically determined memory location, automatically identifying a next available memory location.

4. The method of claim 3 wherein identifying a next available memory location comprises identifying an available memory location having a lowest address.

5. The method of claim 3 wherein identifying a next available memory location includes identifying a memory location not already having information stored therein.

6. The method of claim 1 and further comprising providing an audible signal upon successfully storing identifying information at a memory location.

7. The method of claim 1 and further comprising detecting a tactile user input that corresponds to concluding the learning mode and thereafter concluding the learning mode.

8. The method of claim 1 and further comprising comparing received identifying information from wireless transmissions with previously stored identifying information prior to storing the received identifying information at a non-buffer memory location.

9. The method of claim 8 and further comprising not storing any received identifying information at a non-buffer memory location that matches previously stored identifying identification.

10. The method of claim 8 and further comprising, upon determining that a given item of received identifying information matches previously stored identifying information, displaying an address as corresponds to a memory location that retains the matching previously stored identifying information.

11. The method of claim 8 wherein, when the identifying information includes both fixed identifying information and dynamic identifying information, only comparing the fixed identifying information with previously stored identifying information prior to storing the received identifying information at a non-buffer memory location.

12. The method of claim 1 wherein monitoring for both additional tactile user input and reception of a wireless transmission includes monitoring for additional tactile user input, reception of a wireless transmission, and conclusion of a monitor window, and further comprising ending the learning mode upon detecting conclusion of the monitor window.

13. The method of claim 12 wherein upon detecting additional tactile user input that comprises identification of an address for a memory location, automatically thereafter storing at that memory location identifying information as is contained in a later received compatible wireless transmission includes, upon detecting additional tactile user input that comprises identification of an address for a memory location, automatically thereafter storing at that memory location identifying information as is contained in a later received compatible wireless transmission and automatically extending duration of the monitor window.

14. The method of claim 12 wherein upon detecting an earlier received wireless transmission that comprises a compatible wireless transmission containing identifying information before detecting additional tactile user input that comprises identification of an address for a memory location, automatically thereafter storing at an automatically determined memory location the identifying information as corresponds to the earlier received wireless transmission includes, upon detecting an earlier received wireless transmission that comprises a compatible wireless transmission containing identifying information before detecting additional tactile user input that comprises identification of an address for a memory location, automatically thereafter storing at an automatically determined memory location the identifying information as corresponds to the earlier received wireless transmission and automatically extending duration of the monitor window.

15. The method of claim 12 wherein:

upon detecting additional tactile user input that comprises identification of an address for a memory location, automatically thereafter storing at that memory location identifying information as is contained in a later received compatible wireless transmission includes, upon detecting additional tactile user input that comprises identification of an address for a memory location, automatically thereafter storing at that memory location identifying information as is contained in a later received compatible wireless transmission and automatically extending duration of the monitor window; and upon detecting an earlier received wireless transmission that comprises a compatible wireless transmission containing identifying information before detecting additional tactile user input that comprises identification of an address for a memory location, automatically thereafter storing at an automatically determined memory location the identifying information as corresponds to the earlier received wireless transmission includes, upon detecting an earlier received wireless transmission that comprises a compatible wireless transmission containing identifying information before detecting additional tactile user input that comprises identification of an address for a memory location, automatically thereafter storing at an automatically determined memory location the identifying information as corresponds to the earlier received wireless transmission and automatically extending duration of the monitor window.

16. The method of claim 15 wherein extending duration of the monitor window includes extending the duration by a predetermined period of time.

17. The method of claim 16 wherein extending the duration by a predetermined period of time comprises extending the duration by at least 25 seconds.

18. The method of claim 15 and further comprising repeating steps B, C, and D at least until the monitor window concludes, such that multiple items of identifying information can be stored in memory without requiring intervening tactile user inputs.

19. A method comprising:

A) detecting a tactile user input that corresponds to initiation of a learning mode;

B) beginning a monitoring window;

during the monitoring window:

C) monitoring for both additional tactile user inputs and reception of a wireless transmissions;

D) upon detecting additional tactile user inputs that comprise identification of an address for a memory location, automatically thereafter storing at that memory location identifying information as is contained in a later received compatible wireless transmission and automatically extending the monitoring window;

E) upon detecting earlier received wireless transmissions that comprise a compatible wireless transmission containing identifying information before detecting additional tactile user input that comprises identification of an address for a memory location, automatically thereafter storing at an automatically determined memory location the identifying information as corresponds to the earlier received wireless transmission and automatically extending the monitoring window;

wherein when the monitoring window concludes:

F) concluding the learning mode;

such that, during a single learning mode, a plurality of items of identifying information can be stored at memory locations without requiring intervening tactile user inputs.

20. The method of claim 19 wherein the monitoring window comprises a window of predetermined duration.

21. The method of claim 19 wherein the predetermined duration is about 30 seconds.

22. The method of claim 20 wherein, when the monitoring window is automatically extended, is extended by a predetermined duration.

23. The method of claim 22 wherein the predetermined duration is about 30 seconds.

* * * * *